United States Patent
Matsunaga et al.

(10) Patent No.: US 8,542,458 B2
(45) Date of Patent: Sep. 24, 2013

(54) MAGNETIC DISK DRIVE AND METHOD FOR CONTROLLING MICROACTUATOR IN MAGNETIC DISK DRIVE

(75) Inventors: Toshitaka Matsunaga, Akishima (JP); Hideo Sado, Ome (JP); Koichi Aikawa, Kawasaki (JP); Tetsuya Tabuchi, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 135 days.

(21) Appl. No.: 13/290,459

(22) Filed: Nov. 7, 2011

(65) Prior Publication Data

US 2012/0162813 A1 Jun. 28, 2012

(30) Foreign Application Priority Data

Dec. 24, 2010 (JP) ................................. 2010-288831

(51) Int. Cl.
*G11B 5/596* (2006.01)
(52) U.S. Cl.
USPC ..................................... 360/77.02; 360/77.05
(58) Field of Classification Search
None
See application file for complete search history.

(56) References Cited

U.S. PATENT DOCUMENTS

| | | | |
|---|---|---|---|
| 6,624,982 B2 | 9/2003 | Masuda et al. | |
| 6,697,211 B2 | 2/2004 | Koganezawa | |
| 7,027,253 B1 * | 4/2006 | Sun et al. ...................... | 360/75 |
| 2001/0024340 A1 | 9/2001 | Masuda et al. | |
| 2002/0027774 A1 | 3/2002 | Nishiyama et al. | |
| 2009/0122438 A1 | 5/2009 | Matsuzawa et al. | |

FOREIGN PATENT DOCUMENTS

| | | |
|---|---|---|
| JP | 02-263369 | 10/1990 |
| JP | 09-330572 | 12/1997 |
| JP | 2001-266517 A | 9/2001 |
| JP | 2002-074872 A | 3/2002 |
| JP | 2009-123270 | 6/2009 |

OTHER PUBLICATIONS

Notice of Reasons for Rejection mailed by Japan Patent Office on Aug. 7, 2012 in the corresponding Japanese patent application No. 2010-288831.
Notification of Reasons for Rejection mailed by Japan Patent Office on May 8, 2012 in the corresponding to Japanese patent application No. 2010-288831.

* cited by examiner

*Primary Examiner* — Paul Huber
(74) *Attorney, Agent, or Firm* — Knobbe, Martens, Olson & Bear LLP

(57) ABSTRACT

According to one embodiment, a magnetic disk drive includes a disk, a first microactuator, a second microactuator and a servo controller. The disk comprises a first surface and a second surface. The first and second microactuators allow first and second heads associated with the first and second surfaces to make micromotion based on first and second operation amounts, respectively. The servo controller provides a third operation amount to the first microactuator as the first operation amount and provides an operation amount obtained by inverting a polarity of a frequency component with a particular frequency contained in the third operation amount, to the second microactuator as the second operation amount, if the third operation amount is generated as an operation amount to be provided to the first microactuator in a particular mode in which the first surface is used as a tracking surface.

10 Claims, 3 Drawing Sheets

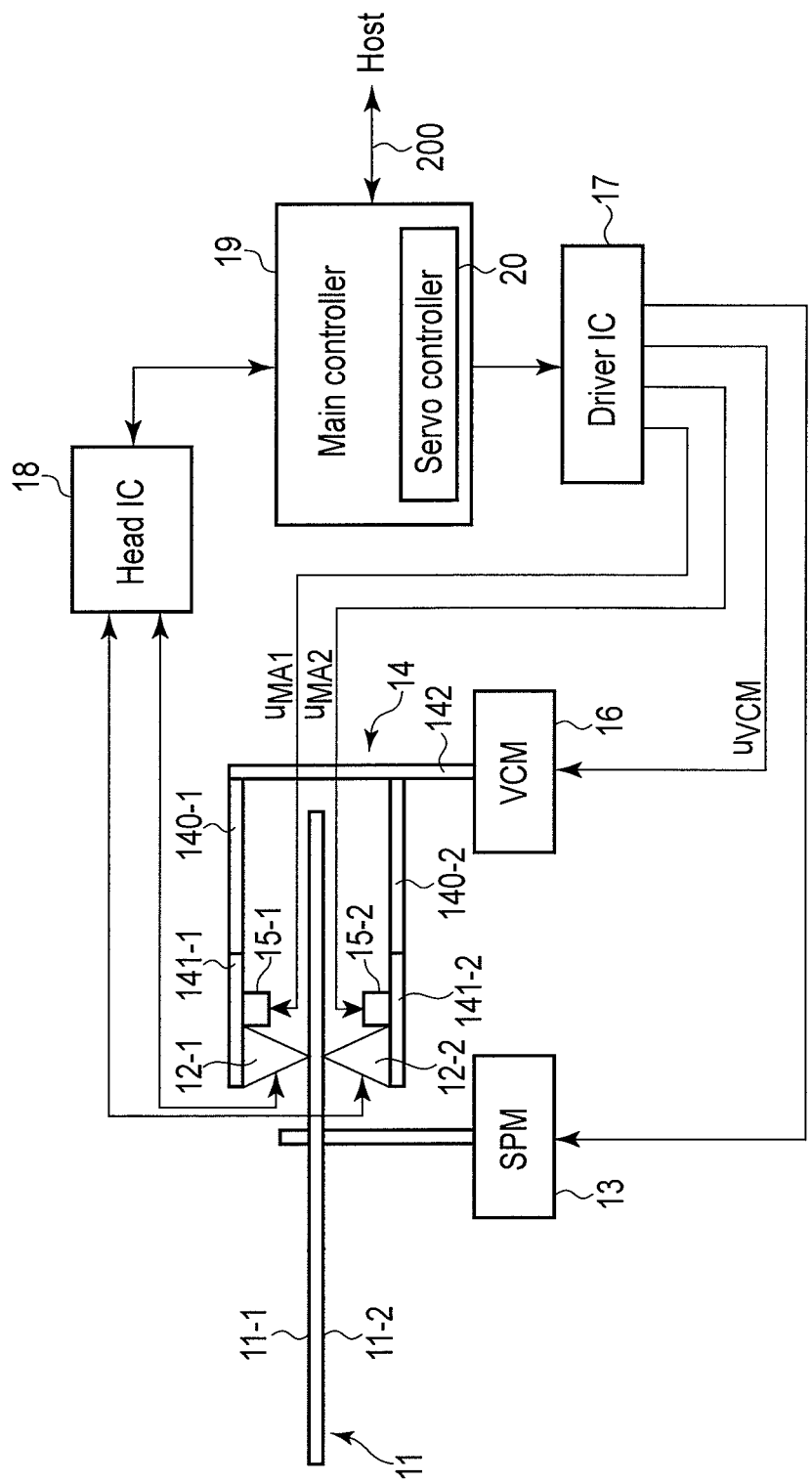
F I G. 1

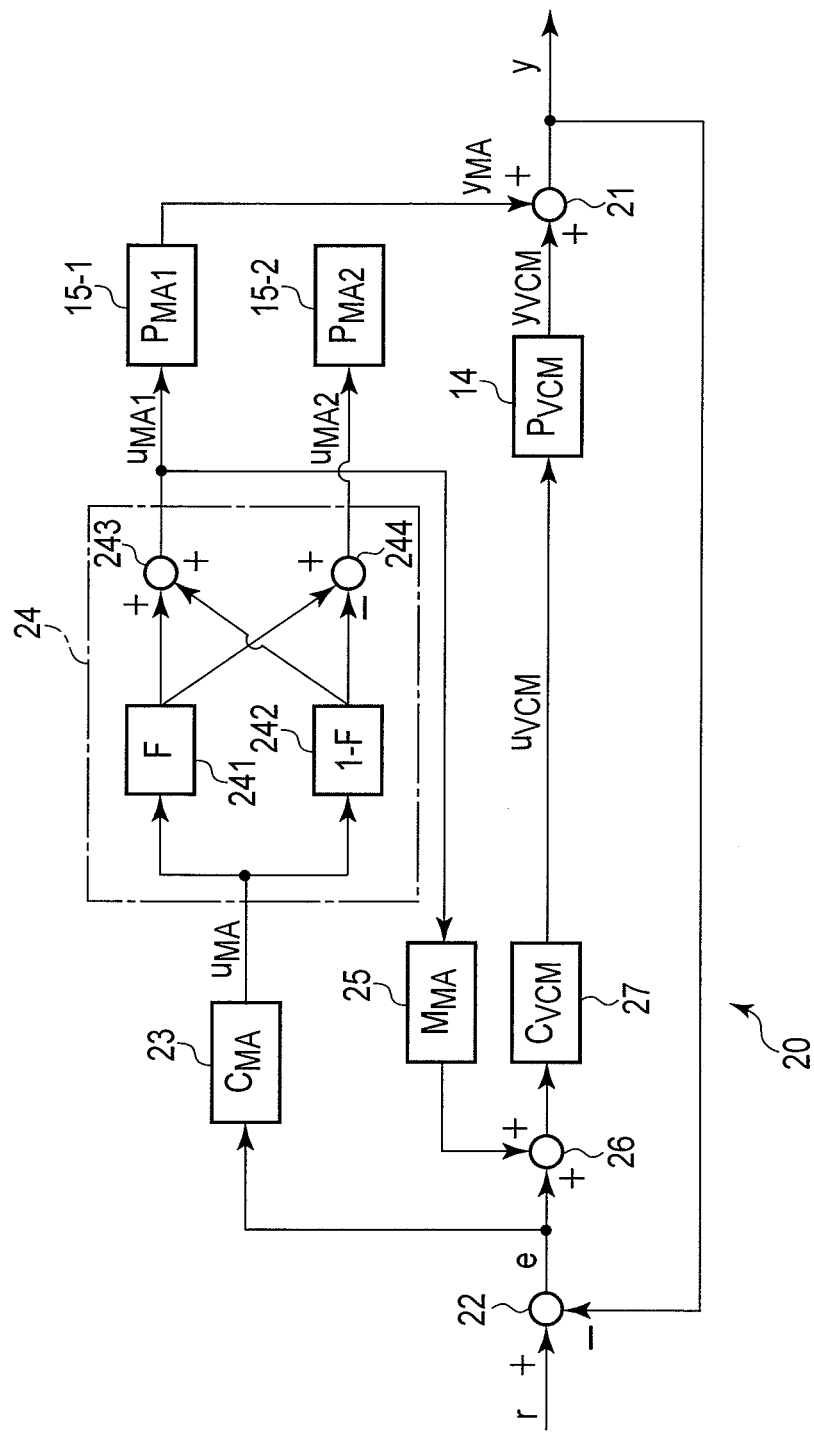
F I G. 2

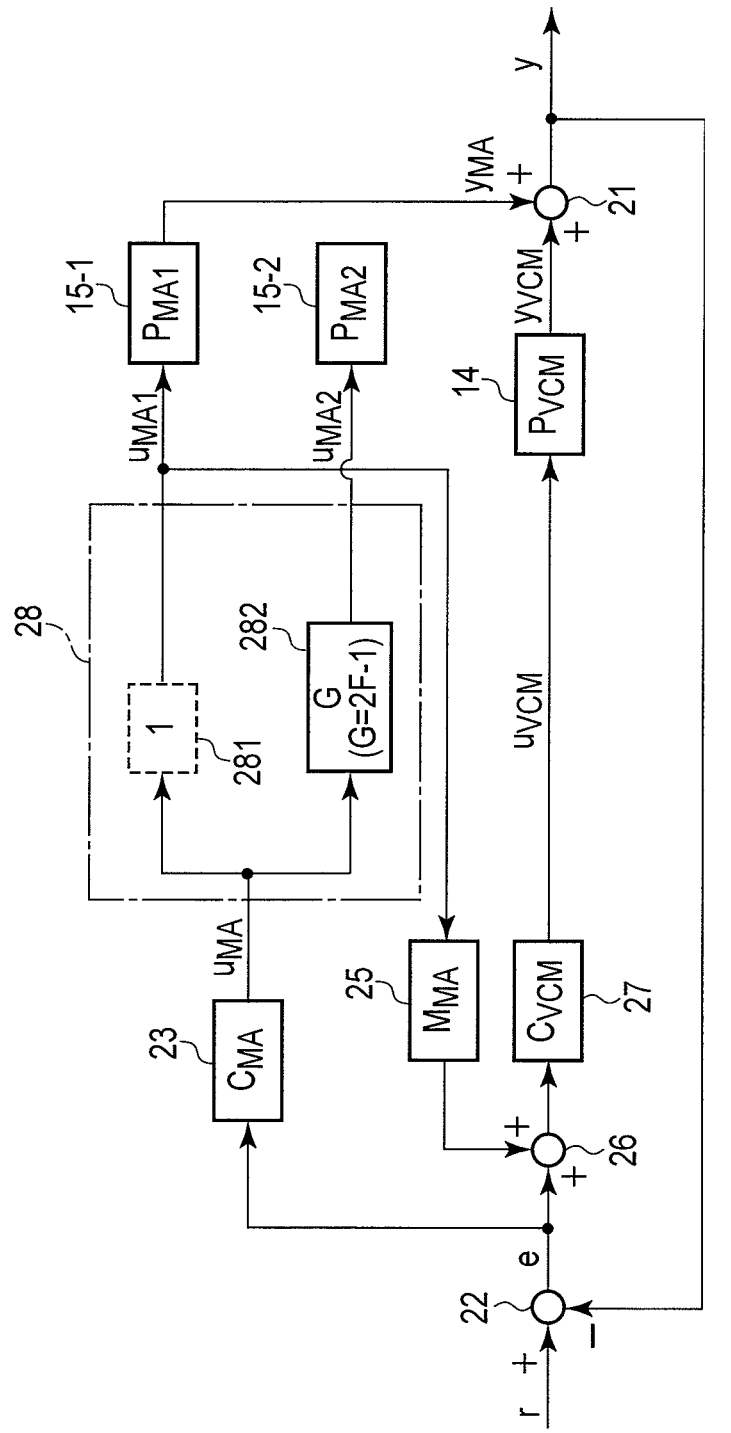
F I G. 3

MAGNETIC DISK DRIVE AND METHOD FOR CONTROLLING MICROACTUATOR IN MAGNETIC DISK DRIVE

CROSS-REFERENCE TO RELATED APPLICATIONS

This application is based upon and claims the benefit of priority from prior Japanese Patent Application No. 2010-288831, filed Dec. 24, 2010, the entire contents of which are incorporated herein by reference.

FIELD

Embodiments described herein relate generally to a magnetic disk drive comprising a microactuator and a method for controlling the microactuator in the magnetic disk drive.

BACKGROUND

As is well known, a magnetic disk drive comprises a magnetic disk as a recording medium. The magnetic disk is hereinafter sometimes simply referred to as a disk. Servo data (servo patterns) is recorded, for example, on both surfaces of the disk. The servo data is used to position a head at a target position on the disk.

Recent magnetic disk drives have a function (what is called a self-servo writing function) in which the magnetic disk drive itself writes servo data to both surfaces of the disk. The self-servo writing is generally carried out as follows. First, it is assumed that the disk comprises a first surface and a second surface and that original servo data is already recorded on the first surface. It is also assumed that a first head and a second head are arranged in association with the first surface and the second surface, respectively. In this case, the first head is positioned at a target position on the first surface (that is, tracking is performed) based on the original servo data recorded on the first surface. That is, the first surface is used as a tracking surface. In this state, the first head and the second head simultaneously write the servo data to the first surface and the second surface, respectively. The second surface, which is not used for tracking, is hereinafter referred to as the non-tracking surface or the servo writing surface. Additionally, the self-servo writing, in which the servo data is written simultaneously to each of the opposite surfaces of the disk, is hereinafter referred to as servo writing using a bank write method.

Furthermore, in recent years, magnetic disk drives have emerged which comprise microactuators (micromotion actuators) associated with the respective surfaces of the disk. Compared to a primary actuator (coarse motion actuator, VCM actuator), each of the microactuators enables the corresponding head to make micromotion independently of the other head. Thus, in the magnetic disk drive comprising microactuators, a first operation amount is provided to a microactuator (first microactuator) associated with the first surface (tracking surface) of the disk. On the other hand, a second operation amount that is different from the first operation amount is provided to a microactuator (second microactuator) associated with the second surface (non-tracking surface) of the disk.

As described above, in the magnetic disk drive comprising the first and second microactuators, the first and second microactuators are driven independently. Thus, the first and second microactuators are provided independently with the first and second operation amounts, respectively.

Here, it is assumed that data is written simultaneously to both surfaces of the disk as is the case with the servo writing using the bank write method. In such a case, if an operation amount obtained by inverting the polarity of the first operation amount is used as the second operation amount, positioning errors reverse in phase between the first surface and the second surface of the disk can be inhibited. However, positioning errors the same in phase on between the first surface and the second surface of the disk increase on the second surface. Thus, there has been a demand to also reduce positioning errors on the second surface of the disk if the first surface of the disk is used as a tracking surface.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is a block diagram showing an exemplary configuration of a magnetic disk drive according to an embodiment;

FIG. 2 is a block diagram showing an exemplary configuration of a servo controller applied in the embodiment; and FIG. 3 is a block diagram showing an exemplary configuration of a servo controller applied in a modification of the embodiment.

DETAILED DESCRIPTION

Various embodiments will be described hereinafter with reference to the accompanying drawings.

In general, according to one embodiment, a magnetic disk drive comprises a disk, a first microactuator, a second microactuator and a servo controller. The disk comprises a first surface and a second surface. The first microactuator is configured to allow a first head associated with the first surface to make micromotion based on a first operation amount. The second microactuator is configured to allow a second head associated with the second surface to make micromotion based on a second operation amount. The servo controller is configured to provide a third operation amount to the first microactuator as the first operation amount and to provide an operation amount obtained by inverting a polarity of a frequency component with a particular frequency contained in the third operation amount, to the second microactuator as the second operation amount, if the third operation amount is generated as an operation amount to be provided to the first microactuator in a particular mode in which the first surface is used as a tracking surface.

FIG. 1 is a block diagram showing an exemplary configuration of a magnetic disk drive according to an embodiment. A magnetic disk drive (hereinafter referred to as an HDD) shown in FIG. 1 comprises a disk (magnetic disk) 11, heads (magnetic head) 12-1 and 12-2, a spindle motor (SPM) 13, a main actuator 14, microactuators 15-1 and 15-2, a voice coil motor (VCM) 16, a driver IC 17, a head IC 18, and a main controller 19.

The disk 11 is a magnetic recording medium comprising an upper disk surface (first surface) 11-1 and a lower disk surface (second surface) 11-2. Disk surfaces 11-1 and 11-2 form recording surfaces on which data is magnetically recorded. The disk 11 is rotated at high speed by the SPM 13. The SPM 13 is driven by a drive current (or a drive voltage) supplied by the driver IC 17.

Head (first head) 12-1 is arranged in association with disk surface 11-1 of the disk 11. Head (second head) 12-2 is arranged in association with disk surface 11-2 of the disk 11. That is, heads 12-1 and 12-2 are associated with disk surfaces 11-1 and 11-2, respectively. Each of heads 12-1 and 12-2 comprises a read element and a write element (not shown in the drawings). Head 12-1 is used to write data to disk surface 11-1 of the disk 11 and to read data from disk surface 11-1. Head 12-2 is used to write data to disk surface 11-2 of the disk 11 and to read data from disk surface 11-2. In the configuration in FIG. 2, the HDD is assumed to comprise the single disk 11. However, a plurality of the disks 11 may be arranged in the HDD in a stacked manner.

The main actuator 14 comprises arms 140-1 and 140-2 associated with disk surfaces 11-1 and 11-2 of the disk 11. Heads 12-1 and 12-2 are attached to the tips of suspensions 141-1 and 141-2 (more specifically, head sliders provided at the tips of suspensions 141-1 and 141-2) extending from arms 140-1 and 140-2, respectively, of the main actuator 14.

Microactuator (first microactuator) 15-1 is attached to suspension 141-1 (more specifically, to between suspension 141-1 and a head slider) in proximity to head 12-1. Similarly, microactuator (second microactuator) 15-2 is attached to suspension 141-2 in proximity to head 12-2. Microactuators 15-1 and 15-2 are independently driven based on operation amounts $u_{MA1}$ and $u_{MA2}$ (more specifically, for example, drive voltages designated by operation amounts $u_{MA1}$ and $u_{MA2}$, respectively) provided by the main controller 19 via the driver IC 17. Thus, microactuators 15-1 and 15-2 allow the corresponding heads 12-1 and 12-2 to make micromotion.

The main actuator 14 is supported so as to move pivotally around a pivotal axis 142. The main actuator 14 comprises the VCM 16. The VCM 16 is a drive source for the main actuator 14. The VCM 16 is driven based on an operation amount $u_{VCM}$ (more specifically, for example, a drive current designated by operation amount $u_{VCM}$) provided by the main controller 19 via the driver IC 17 to allow the main actuator 14 to move pivotally around the pivotal axis 142. That is, the VCM 16 simultaneously moves arms 140-1 and 140-2 of the main actuator 14 in the radial direction of disk surfaces 11-1 and 11-2 of the disk 11. Thus, heads 12-1 and 12-2 are also moved in the radial direction of disk surfaces 11-1 and 11-2 of the disk 11.

The driver IC 17 drives the SPM 13, VCM 16 (that is, the main actuator 14), and microactuators 15-1 and 15-2 under the control of the main controller 19. The head IC 18 amplifies a signal (read signal) read by head 12-1 or 12-2. The head IC 18 also converts write data transferred by the main controller 19 into a write current and outputs the write current to head 12-1 or 12-2.

The main controller 19 is implemented by, for example, a system LSI where a plurality of elements including a microprocessor unit (MPU) and memories are integrated into a single chip. The main controller 19 controls the SPM 13 via the driver IC 17 in order to rotate the disk 11 at high speed.

The main controller 19 also functions a disk controller. The main controller 19 transmits and receives signals to and from a host. Specifically, the main controller 19 receives commands (write commands, read commands, and the like) transferred by the host via a host interface 200. The main controller 19 also controls the data transfer between the host and the main controller 19. The main controller 19 further controls the data transfer between the disk 11 and the main controller 19.

The main controller 19 also functions as a read/write channel. The main controller 19 converts a read signal output by the head IC 18, into digital data. The main controller 19 then decodes read data from the digital data. The main controller 19 extracts servo data required to position head 12-1 or 12-2, from the digital data. The main controller 19 also encodes write data.

The main controller 19 comprises a servo controller 20. The servo controller 20 controls the VCM 16 via the driver IC 17 in order to position heads 12-1 and 12-2 at target positions on disk surfaces 11-1 and 11-2, respectively, of the disk 11. Here, controlling the VCM 16 is equivalent to controlling the main actuator 14 comprising the VCM 16. Thus, the main actuator 14 is hereinafter referred to as the VCM actuator 14. It is assumed that the servo controller 20 controls the VCM actuator 14. The main controller 19 further controls microactuators 15-1 and 15-2 independently via the diver IC 17 in order to fine-tune heads 12-1 and 12-2, respectively.

FIG. 2 is a block diagram showing an exemplary configuration of the servo controller 20 applied in the embodiment. The servo controller 20 shown in FIG. 2 has a configuration compatible with a particular mode in which disk surface (first surface) 11-1 of the disk 11 is used as a tracking surface. More specifically, the servo controller 20 has a configuration compatible with the servo writing using the bank write method, in which servo data is written simultaneously to disk surface (first surface) 11-1 and disk surface (second surface) 11-2 of the disk 11. Here, it is assumed that such original servo data as described in, for example, Japanese Patent No. 4227111 is already recorded on disk surface 11-1.

Based on the original servo data recorded on disk surface 11-1, the servo controller 20 controls the VCM actuator 14 and microactuators 15-1 and 15-2 in order to position heads 12-1 and 12-2 at the target positions. For this control, the servo controller 20 forms what is called a dual stage actuator following control system. That is, the servo controller 20 uses disk surface 11-1 as a tracking surface to control the VCM actuator 14, thus coarsely adjusting the positions of heads 12-1 and 12-2. The servo controller 20 also controls microactuators 15-1 and 15-2 individually to finely adjust the positions of heads 12-1 and 12-2.

Thus, in the dual stage actuator following control system, the VCM actuator 14 and microactuators 15-1 and 15-2 are to be controlled. Thus, in FIG. 2, the VCM actuator 14 is denoted as $P_{VCM}$, and microactuators 15-1 and 15-2 are denoted as $P_{MA1}$ and $P_{MA2}$. The servo controller 20 comprises a subtractor 22, a microactuator controller ($C_{MA}$) 23, a filter unit 24, a microactuator model ($M_{MA}$) 25, an adder 26, and a VCM actuator controller ($C_{VCM}$) 27.

In FIG. 2, a symbol y at an addition point 21 indicates the position of head 12-1 (head position) corresponding to the tracking surface. Here, displacement of of microactuator ($P_{MA1}$) 15-1 corresponding to the tracking surface is denoted by $y_{MA}$. In this case, the sum ($y_{VCM}+y_{MA}$) of displacement $y_{VCM}$ and displacement $y_{MA}$ is observed as the head position y. The subtractor 22 calculates the difference of the head position y from the target position r to be a deviation e (=r−y). Based on the deviation e, the microactuator controller 23 generates an operation amount (third operation amount) $u_{MA}$ to be provided to microactuator 15-1.

The filter unit 24 outputs operation amount (third operation amount) $u_{MA}$ without any change as an operation amount (first operation amount) $u_{MA1}$. The filter unit 24 also outputs, as an operation amount (second operation amount) $u_{MA2}$, an operation amount obtained by inverting the polarity of a frequency component with a particular frequency contained in operation amount (third operation amount) $u_{MA}$. Operation amounts $u_{MA1}$ and $u_{MA2}$ are used to drive microactuators 15-1 and 15-2, respectively. The filter unit 24 comprises a band elimination filter (F) 241, a bandpass filter (1−F) 242, an adder 243, and an adder 244.

The band elimination filter (F) 241 eliminates a frequency component with a particular frequency from operation amount $u_{MA}$. An operation amount (fourth operation amount) obtained by eliminating the frequency component with the particular frequency from operation amount $u_{MA}$ is hereinafter referred to as operation amount $F \cdot u_{MA}$. The bandpass filter (1−F) 242 allows passage of a frequency component with a particular frequency contained in operation amount $u_{MA}$. An operation amount (fifth operation amount) obtained by allowing the passage of the frequency component with the particular frequency contained in operation amount $u_{MA}$ is hereinafter referred to as operation amount $(1-F) \cdot u_{MA}$.

The adder (first adder) 243 adds operation amount $F \cdot u_{MA}$ output by the band elimination filter 241 to operation amount $(1-F) \cdot u_{MA}$ output by the bandpass filter 242. The addition result from the adder 243 is used as $u_{MA1}$. The adder (second adder) 244 adds operation amount $F \cdot u_{MA}$ to an operation amount $-(1-F) \cdot u_{MA}$ obtained by inverting the polarity of operation amount $(1-F) \cdot u_{MA}$. The addition result from the adder 244 is used as $u_{MA2}$. Instead of the adder 244, a subtractor may be used which subtracts operation amount $(1-F) \cdot u_{MA}$ from operation amount $F \cdot u_{MA}$.

Based on operation amount $u_{MA1}$ provided to microactuator 15-1 by the filter unit 24, the microactuator model 25 obtains the displacement of microactuator 15-1. The adder 26 adds the displacement obtained by the microactuator model 25 to the deviation e calculated by the subtractor 22. The VCM actuator controller 27 generates an operation amount $u_{VCM}$ to be provided to the VCM actuator 14 based on an output from the adder 26. Thus, in the dual stage actuator following control system, the displacement obtained by the microactuator model ($M_{MA}$) 25 is added to the deviation e. The addition result is input to the VCM actuator controller ($C_{VCM}$) 27. That is, the dual stage actuator following control system forms a non-interference control system.

Now, the operation of the embodiment will be described taking servo writing using the bank write method, as an example. In the embodiment, it is assumed that the servo writing using the bank write method is carried out in the particular mode in which disk surface 11-1 of the disk 11 is used as a tracking surface. Here, in particular, generation of operation amounts $u_{MA1}$ and $u_{MA2}$ provided to microactuators 15-1 and 15-2, respectively, will be described. In the servo writing using the bank write method, operation amounts $u_{MA1}$ and $u_{MA2}$ are used to accurately position heads 12-1 and 12-2 at the target positions on disk surfaces 11-1 and 11-2, respectively, of the disk 11.

First, the microactuator controller 23 generates an operation amount $u_{MA}$ to be provided to microactuator 15-1, based on the deviation e. Microactuator 15-1 corresponds to disk surface 11-1 of the disk 11, which is used as the tracking surface. Operation amount $u_{MA}$ contains a frequency component with a particular frequency which inhibits positioning errors caused by disk flutter (disk flutter disturbance) when head 12-1 corresponding to disk surface 11-1 (tracking surface) is positioned at the target position. Thus, the particular frequency is almost equal to the frequency of the positioning errors caused by the disk flutter (this frequency is hereinafter referred to as the flutter component of the positioning errors).

The flutter component of the positioning errors depends on the resonance characteristics of the disk, the rotation speed of the disk 11, and the like. The resonance characteristics of the disk 11 depend on the material, size, and holding condition (the manner of holding the disk) of the disk 11. In common HDDs such as 2.5-inch HDDs and 3.5-inch HDDs, the flutter component of the positioning errors is distributed, for example, between one and several kilohertz. Furthermore, within the frequency range between one and several kilohertz, a low-frequency component with a frequency of, for example, between 1 and 2 kHz is larger than the other frequency components.

Thus, in the embodiment, operation amount $u_{MA}$ generated by the microactuator controller 23 contains, for example, a frequency component with a frequency of between 1 and 2 kHz which significantly impacts disk positioning and which corresponds to the frequency component with the particular frequency inhibiting positioning errors on the tracking surface caused by disk flutter. Here, the positioning errors caused by the disk flutter are reverse in phase between disk surface 11-1 (tracking surface) and disk surface 11-2 (non-tracking surface) of the disk 11 as also described in Japanese Patent No. 4227111.

Furthermore, operation amount $u_{MA}$ also contains a frequency component with a frequency which is different from the above-described particular frequency and which inhibits positioning errors caused by disturbance other than the disk flutter. The runout of the disk 11 (disk runout) and a fluid originated force are known as the disturbance other than the disk flutter. The fluid originated force is a force exerted, on a control target, by a flow of air generated in conjunction with rotation of the disk 11. For the positioning errors caused by the disturbance other than the disk flutter, the frequency component of positioning errors caused by disturbance significantly impacting head positioning is different from that with the above-described particular frequency. For example, the frequency component of positioning errors caused by the disk runout or the fluid originated force is lower than 1 kHz. The positioning errors caused by the disturbance such as the disk runout or the fluid originated force, which is different from the disk flutter and which significantly impacts the head positioning, are the same in phase between disk surface 11-1 and disk surface 11-2 of the disk 11.

Operation amount $u_{MA}$ generated by the microactuator controller 23 is input to each of the band elimination filter (F) 241 and bandpass filter (1−F) 242 of the filter unit 24.

The band elimination filter 241 eliminates the frequency component with the above-described particular frequency (in the embodiment, between 1 and 2 kHz) from operation amount $u_{MA}$. That is, the band elimination filter 241 allows the frequency components of operation amount $u_{MA}$ other than that with the particular frequency to pass through. Thus, the band elimination filter 241 outputs operation amount $F \cdot u_{MA}$.

On the other hand, the bandpass filter 242 allows a frequency component with a particular frequency contained in operation amount $u_{MA}$ to pass through. That is, the bandpass filter 242 eliminates the frequency components other than that with the particular frequency from operation amount $u_{MA}$. Thus, the bandpass filter 242 outputs operation amount $(1-F) u_{MA}$.

The adder 243 adds operation amount $F \cdot u_{MA}$ and operation amount $(1-F) \cdot u_{MA}$ together. The adder 243 then outputs the addition result as operation amount $u_{MA1}$. Operation amount $u_{MA1}$ is expressed by:

$$u_{MA1} = F \cdot u_{MA} + (1-F) \cdot u_{MA} \qquad (1)$$
$$= 1 \cdot u_{MA}$$
$$= u_{MA}$$

Operation amount $u_{MA1}$ output by the adder 243 (=operation amount $u_{MA}$) is provided to microactuator ($P_{MA1}$) 15-1.

On the other hand, the adder 244 adds operation amount $F \cdot u_{MA}$ to operation amount $-(1-F) \cdot u_{MA}$, obtained by inverting the polarity of operation amount $(1-F) \cdot u_{MA}$. The adder 244 then outputs the addition result as operation amount $u_{MA2}$. Operation amount $u_{MA2}$ is expressed by:

$$u_{MA2} = F \cdot u_{MA} - (1-F) \cdot u_{MA} \quad (2)$$

Operation amount $u_{MA2}$ output by the adder 244 is provided to microactuator ($P_{MA2}$) 15-2. As is apparent from the above description, operation amount $u_{MA1}$ output to microactuator ($P_{MA1}$) 15-1 by the adder 243 is equal to operation amount $u_{MA}$ output by the microactuator controller ($C_{MA}$) 23. On the other hand, operation amount $u_{MA2}$ output to microactuator ($P_{MA2}$) 15-2 by the adder 244 corresponds to a component obtained by adding (superimposing) component $F \cdot u_{MA}$ passing through the band elimination filter (F) 241 to component $-(1-F) \cdot u_{MA}$, obtained by inverting the polarity of component $(1-F) \cdot u_{MA}$ passing through the bandpass filter $(1-F)$ 242.

As is apparent from the above description, the band elimination filter (F) 241 and bandpass filter (1−F) 242 assumed in the embodiments are characterized as follows.

(1) The frequency component allowed to pass through the band elimination filter (F) 241 inhibits the positioning errors which are the same in phase between disk surface 11-1 (tracking surface) and disk surface 11-2 (non-tracking surface) of the disk 11. Thus, condition 1 needs to be met in order to inhibit the positioning errors having the same phase on disk surface 11-2. Condition 1 is such that operation amount $u_{MA2}$ contains the frequency component allowed to pass through the band elimination filter (F) 241 with the polarity of the component not inverted.

(2) The frequency component (with the particular frequency) allowed to pass through the bandpass filter (F) 242 inhibits the positioning errors reverse in phase between disk surface 11-1 and disk surface 11-2 of the disk 11 (more specifically, the positioning errors on disk surface 11-1). Thus, condition 2 needs to be met in order to inhibit the positioning errors having the reverse phase on disk surface 11-2. Condition 2 is such that operation amount $u_{MA2}$ contains the frequency component allowed to pass through the bandpass filter (1−F) 242 with the polarity of the component inverted.

In the embodiment, the frequency of the frequency component eliminated by the band elimination filter (F) 241 and the frequency of the frequency component allowed to pass through the bandpass filter (1−F) 242 are both set to the value of the frequency of the positioning errors caused by the disk flutter. Thus, operation amount $u_{MA2}$, that is, operation amount $u_{MA2}$ provided to microactuator 15-1 by the adder 244, meets conditions 1 and 2, as is also apparent from Equation (2) described above. That is, in the embodiment, the servo controller 20 can generate operation amount $u_{MA2}$ characterized as follows. First, operation amount $u_{MA2}$ contains the frequency component inhibiting the positioning errors which are caused by the disturbance other than the disk flutter and which are the same in phase between disk surface 11-1 and disk surface 11-2 of the disk 11 (more specifically, the positioning errors on disk surface 11-2). Second, operation amount $u_{MA2}$ contains the frequency component inhibiting the positioning errors which are caused by the disk flutter and which are reverse in phase between disk surface 11-1 and disk surface 11-2 of the disk 11 (more specifically, the positioning errors on disk surface 11-2).

As described above, operation amount $u_{MA2}$ is provided to microactuator ($P_{MA2}$) 15-2. On the other hand, operation amount $u_{MA1}$ is provided to microactuator ($P_{MA1}$) 15-1. That is, the servo controller 20 controls microactuator ($P_{MA1}$) 15-1 based on operation amount $u_{MA1}$, and simultaneously controls microactuator ($P_{MA2}$) 15-2 based on operation amount $u_{MA2}$. Thus, over disk surfaces 11-1 and 11-2 of the disk 11, heads 12-1 and 12-2, respectively, can be accurately positioned at the target positions with the same relative position.

In the embodiment, generation of operation amounts $u_{MA1}$ and $u_{MA2}$ is applied to the servo writing using the bank write method described in Japanese Patent No. 4227111. In the servo writing using the bank write method, disk surface 11-1 of the disk 11 is assumed to be used as a tracking surface (more specifically, both a tracking surface and a servo writing surface). On the other hand, disk surface 11-2 of the disk 11 is assumed to be used as a servo writing surface (more specifically, both a non-tracking surface and a servo writing surface). This enables an effective reduction not only in displacement of head 12-1 over disk surface 11-1 (tracking surface) but also in displacement of head 12-2 over disk surface 11-2 (servo writing surface). Therefore, the embodiment can contribute to improving servo writing quality.

If unlike in the case of the embodiment, the operation amount obtained simply by inverting the polarity of operation amount $u_{MA}$ is used as operation amount $u_{MA2}$, condition 2 described above is met, but condition 1 described above is not met. In this case, the positioning errors reverse in phase between disk surface 11-1 and disk surface 11-2 of the disk 11 are inhibited on both disk surfaces 11-1 and 11-2. However, the positioning errors the same in phase between disk surface 11-1 and disk surface 11-2 of the disk 11 increase on disk surface 11-2. That is, the displacement of head 12-2 increases on disk surface 11-2 (servo writing surface).

[Modification]

Now, a modification of the embodiment will be described with reference to the drawings. The modification is characterized in that the configuration of the servo controller 20 is simplified. First, Equation (2) described above can be expressed by:

$$u_{MA2} = (2F-1) \cdot u_{MA} \quad (3)$$

Here, if $G=2F-1$, Equation (3) can be expressed by:

$$u_{MA2} = G \cdot u_{MA} \quad (4)$$

Equation (4) indicates that generation of operation amount $u_{MA2}$ based on operation amount $u_{MA}$ can be achieved by a single filter. On the other hand, Equation (1) indicates that operation amount $u_{MA}$ can be used as operation amount $u_{MA1}$ without any change. In the modification of the embodiment, a filter unit for the servo controller 20 is configured in view of the above-described points.

FIG. 3 is a block diagram showing an exemplary configuration of the servo controller applied in the modification of the embodiment. Elements in FIG. 3 which are equivalent to corresponding ones in FIG. 2 are denoted by the same reference numerals. The servo controller 20 shown in FIG. 3 is different from that shown in FIG. 2 in that a filter unit 28 is used instead of the filter unit 24. The filter unit 28 comprises filters 281 and 282.

The filter 281 allows operation amount $u_{MA}$ generated by the microactuator controller 23 to pass through without any change as operation amount $u_{MA1}$. As is apparent from Equation (1) described above, the relationship between operation amounts $u_{MA}$ and $u_{MA1}$ is such that $u_{MA} = 1 \cdot u_{MA1} = u_{MA1}$. The filter 281 is a virtual filter introduced in order to make the relationship between operation amounts $u_{MA}$ and $u_{MA1}$ easily understood. The filter 281 is thus physically unnecessary. On the other hand, the filter 282 outputs the operation amount obtained by inverting the polarity of the frequency component with the particular frequency contained in operation amount $u_{MA}$, as operation amount $u_{MA2}$. That is, the filter 282 allows the frequency components of operation amount $u_{MA}$ other than the one with the particular frequency to pass through. As is the case with the embodiment, the servo controller 20 configured as shown in FIG. 3 can generate operation amount $u_{MA2}$ that meets conditions 1 and 2 described above. Furthermore, the configuration of the filter unit can be simplified.

At least one of the embodiments can provide a magnetic disk drive with a microactuator in which if a first surface of the disk is used as a tracking surface, positioning errors on the second surface of the disk can also be reduced, as well as a method for controlling the microactuator in the magnetic disk drive.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk drive comprising:
   a disk comprising a first surface and a second surface;
   a first microactuator configured to allow a first head to make micromotion based on a first operation amount, the first head associated with the first surface;
   a second microactuator configured to allow a second head to make micromotion based on a second operation amount, the second head associated with the second surface; and
   a servo controller configured to provide the first operation amount to the first microactuator and to provide the second operation amount to the second microactuator, the second operation amount obtained by inverting a polarity of a first frequency component with a particular frequency contained in the first operation amount and by not inverting polarities of frequency components other than the first frequency component if the first operation amount is generated in a particular mode in which the first surface is used as a tracking surface,
   wherein:
   the servo controller comprises a filter module configured to output the second operation amount based on the first operation amount;
   frequency components contained in the first operation amount comprise the first frequency component, where the first frequency component inhibits a positioning error on the first surface having a phase reverse to a phase of a positioning error on the second surface, and frequency components of the first operation amount other than the first frequency component inhibit a positioning error on the first surface having a phase the same as a phase of a positioning error on the second surface; and
   the first frequency component results from disk flutter.

2. The magnetic disk drive of claim 1, wherein the particular mode is set for servo writing to which bank write is applied.

3. The magnetic disk drive of claim 1, further comprising a microactuator controller configured to generate the first operation amount based on a deviation from a target position for the first head.

4. The magnetic disk drive of claim 1, wherein the filter module comprises:
   a band elimination filter configured to eliminate the first frequency component from the first operation amount and to output a third operation amount;
   a bandpass filter configured to allow the first frequency component from the first operation amount to pass through and to output a fourth operation amount;
   a first adder configured to add the third operation amount and the fourth operation amount together and to output the first operation amount; and
   a second adder configured to add the third operation amount to a fifth operation amount obtained by inverting a polarity of the fourth operation amount, and to output the second operation amount.

5. A method for controlling a first microactuator and a second microactuator in a magnetic disk drive, the first microactuator configured to allow a first head to make micromotion based on a first operation amount, the first head associated with a first surface of a disk, the second microactuator being configured to allow a second head to make micromotion based on a second operation amount, the second head associated with a second surface of the disk, wherein the method comprises:
   generating the first operation amount to be provided to the first microactuator when the first surface is used as a tracking surface;
   providing the first operation amount to the first microactuator; and
   providing the second operation amount to the second microactuator, the second operation amount obtained by inverting a polarity of a first frequency component contained in the first operation inverting polarities of frequency components other than the first frequency component.

6. The method of claim 5, wherein the first operation amount is generated based on a deviation from a target position for the first head.

7. The method of claim 5, further comprising:
   eliminating the first frequency component from the first operation amount and outputting a third operation amount;
   allowing the first frequency component from the first operation amount to pass through and outputting a fourth operation amount;
   adding the third operation amount and the fourth operation amount together and outputting the first operation amount; and
   adding the third operation amount to a fifth operation amount obtained by inverting a polarity of the fourth operation amount, and outputting the second operation amount.

8. A magnetic disk drive comprising:
   a disk comprising a first surface and a second surface;
   a first microactuator configured to allow a first head to make micromotion based on a first operation amount, the first head associated with the first surface;

a second microactuator configured to allow a second head to make micromotion based on a second operation amount, the second head associated with the second surface; and a servo controller configured to provide the first operation amount to the first microactuator and to provide the second operation amount to the second microactuator, the second operation amount obtained by inverting a polarity of a first frequency component contained in the first operation amount and resulting from disk flutter, and by not inverting polarities of frequency components other than the first frequency component if the first operation amount is generated when the first surface is used as a tracking surface.

9. The magnetic disk drive of claim 8, further comprising a microactuator controller configured to generate the first operation amount based on a deviation from a target position for the first head.

10. The magnetic disk drive of claim 8, wherein the servo controller comprises:

a band elimination filter configured to eliminate the first frequency component from the first operation amount and to output a third operation amount;

a bandpass filter configured to allow the first frequency component from the first operation amount to pass through and to output a fourth operation amount;

a first adder configured to add the third operation amount and the fourth operation amount together and to output the first operation amount; and a second adder configured to add the third operation amount to a fifth operation amount obtained by inverting a polarity of the fourth operation amount, and to output the second operation amount.

* * * * *